US009226247B2

United States Patent
Kim et al.

(10) Patent No.: US 9,226,247 B2
(45) Date of Patent: Dec. 29, 2015

(54) METHOD FOR TERMINAL DECIDING UPLINK TRANSMISSION POWER IN MACRO CELL ENVIRONMENT COMPRISING REMOTE RADIO HEAD (RRH), AND TERMINAL APPARATUS FOR SAME

(75) Inventors: Dongcheol Kim, Anyang-si (KR); Hangyu Cho, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 116 days.

(21) Appl. No.: 14/239,505

(22) PCT Filed: Aug. 20, 2012

(86) PCT No.: PCT/KR2012/006608
§ 371 (c)(1),
(2), (4) Date: Feb. 18, 2014

(87) PCT Pub. No.: WO2013/027987
PCT Pub. Date: Feb. 28, 2013

(65) Prior Publication Data
US 2014/0177467 A1   Jun. 26, 2014

Related U.S. Application Data

(60) Provisional application No. 61/525,202, filed on Aug. 19, 2011, provisional application No. 61/546,566, filed on Oct. 13, 2011.

(51) Int. Cl.
*H04W 52/42* (2009.01)
*H04W 52/24* (2009.01)
(Continued)

(52) U.S. Cl.
CPC .............. *H04W 52/42* (2013.01); *H04W 24/08* (2013.01); *H04W 52/226* (2013.01);
(Continued)

(58) Field of Classification Search
None
See application file for complete search history.

(56) References Cited

U.S. PATENT DOCUMENTS

2012/0195264 A1*  8/2012  Taoka et al. .................. 370/328
2012/0257515 A1* 10/2012  Hugl et al. .................... 370/252
(Continued)

FOREIGN PATENT DOCUMENTS

JP      2011-097225      5/2011
KR      2009-0088086     8/2009
(Continued)

OTHER PUBLICATIONS

PCT International Application No. PCT/KR2012/006608, Written Opinion of the International Searching Authority dated Feb. 22, 2013, 14 pages.

*Primary Examiner* — Dang Ton
*Assistant Examiner* — Ronald H Davis
(74) *Attorney, Agent, or Firm* — Lee, Hong, Degerman, Kang & Waimey

(57) ABSTRACT

Disclosed is a method for a terminal deciding an uplink transmission power in a macro cell environment, comprising at least one remote radio head (RRH). The method for the terminal deciding the uplink transmission power, comprises the steps of: receiving from the base station configuration information on the base station and on a state channel information-reference signal (CSI-RS) of the at least one RRH and CSI-RS transmission power information; measuring the strength of a received signal of the CSI-RS which is received from the at least one RRH; and estimating downlink path loss that corresponds to a node that is set as a reception point or a reception RRH by using the configuration information on the CSI-RS and the CSI-RS transmission power information.

6 Claims, 10 Drawing Sheets

(a)

(b)

(51) Int. Cl.
  *H04W 52/40* (2009.01)
  *H04W 24/08* (2009.01)
  *H04W 88/02* (2009.01)
  *H04W 52/22* (2009.01)
  *H04W 52/14* (2009.01)
  *H04L 25/02* (2006.01)
  *H04B 7/02* (2006.01)

(52) U.S. Cl.
  CPC ......... *H04W 52/242* (2013.01); *H04W 52/245* (2013.01); *H04W 52/246* (2013.01); *H04W 52/40* (2013.01); *H04W 88/02* (2013.01); *H04B 7/024* (2013.01); *H04L 25/0228* (2013.01); *H04W 52/146* (2013.01)

(56) References Cited

U.S. PATENT DOCUMENTS

| | | | |
|---|---|---|---|
| 2012/0281555 A1* | 11/2012 | Gao et al. | 370/252 |
| 2013/0029657 A1* | 1/2013 | Gao et al. | 455/422.1 |
| 2014/0141830 A1* | 5/2014 | Skov et al. | 455/522 |

FOREIGN PATENT DOCUMENTS

| | | | | |
|---|---|---|---|---|
| KR | 2011-0053299 | | 5/2011 | |
| WO | 2008/042187 | | 4/2008 | |
| WO | WO 2011/043191 | * | 4/2011 | ............ H04W 52/24 |

\* cited by examiner (a)

(b)

(a)

(b)

(a)

(b)

METHOD FOR TERMINAL DECIDING UPLINK TRANSMISSION POWER IN MACRO CELL ENVIRONMENT COMPRISING REMOTE RADIO HEAD (RRH), AND TERMINAL APPARATUS FOR SAME

CROSS-REFERENCE TO RELATED APPLICATIONS

This application is the National Stage filing under 35 U.S.C. 371 of International Application No. PCT/KR2012/006608, filed on Aug. 20, 2012, which claims the benefit of U.S. Provisional Application Ser. Nos. 61/525,202, filed on Aug. 19, 2011, and 61/546,566, filed on Oct. 13, 2011, the contents of which are all hereby incorporated by reference herein in their entirety.

TECHNICAL FIELD

The present invention relates to wireless communication, and more particularly, to a method for enabling a user equipment to determine an uplink transmission power in a macro cell environment that includes a remote radio head (RRH), and the user equipment.

BACKGROUND ART

It is expected that a long term evolution-advanced (LTE-A) system, which is the standard of the next generation wireless communication system, will support a coordinated multi point (CoMP) system and a multi user-MIMO (MU-MIMO) system, which have not been supported by the existing standard, so as to improve a data transmission rate. In this case, the CoMP system means that two or more base stations or cells perform communication with a user equipment located in a shaded zone by coordinating with each other to improve communication throughput between the base station (cell or sector) and the user equipment. Examples of the CoMP system may include a coordinated MIMO type joint processing (CoMP-JP) system through data sharing and a CoMP-coordinated scheduling/beamforming (CoMP-CS) system. According to the joint processing (CoMP-JP) system, the user equipment may simultaneously receive data from each base station that performs CoMP, and may improve receiving throughput by combining the signals received from each base station. Unlike the joint processing system, according to the coordinated scheduling/beamforming (CoMP-CS) system, the user equipment may momentarily receive data from one base station through beamforming. The MU-MIMO technology means that the base station allocates each antenna resource to different user equipments and selects and schedules a user equipment that enables a high data transmission rate per antenna. This MU-MIMO system is to improve system throughput.

Meanwhile, with the widespread popularization of portable devices such as a smart phone, the amount of radio data has been increased rapidly, whereby a mobile communication network optimized on the basis of voice service has been required to be advanced on the basis of data service. For this reconfiguration of the radio network, additional facility of a base station is required. In this case, huge financial resources are required.

In this respect, a remote radio head (RRH) has been devised as one of methods for providing radio data services of high rate while minimizing the cost required for an advanced communication network. In an environment where RRH has been recently introduced, a user equipment may transmit an uplink signal to a base station or RRH. At this time, a detailed method for enabling a user equipment to determine an uplink transmission power has not been studied.

DISCLOSURE

Technical Problem

An object of the present invention devised to solve the conventional problem is to provide a method for enabling a user equipment to determine an uplink transmission power in a macro cell environment that includes at least one remote radio head (RRH).

Another object of the present invention devised to solve the conventional problem is to provide a user equipment configured to determine an uplink transmission power in a macro cell environment that includes at least one RRH.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, a method of determining an uplink transmission power by a user equipment in a macro cell environment that includes at least one remote radio head (RRH) comprises the steps of receiving, from a base station, channel state information-reference signal (CSI-RS) configuration information and CSI-RS transmission power information of the base station and the at least one RRH; measuring a signal strength of CSI-RS received from the at least one RRH; and estimating a downlink path loss that corresponds to a node that is set as a reception point or a reception RRH by using the signal strength of the received CSI-RS, the CSI-RS configuration information and the CSI-RS transmission power information. The method may further comprise determining an uplink transmission power, to be transmitted to the node set as the reception point or the reception RRH, by using the estimated downlink path loss; and transmitting an uplink signal to the node set as the reception point or the reception RRH by using the determined uplink transmission power. The CSI-RS configuration information includes CSI-RS allocation pattern information of the base station and the at least one RRH, and CSI-RS allocation patterns between the base station and the at least one RRH may be identified from each other in a time domain, a frequency domain or a code domain. The CSI-RS transmission power information includes a CSI-RS transmission power level of the base station and the at least one RRH, wherein the CSI-RS transmission power level may be an absolute value level. The CSI-RS transmission power information includes a CSI-RS transmission power level of the base station and the at least one RRH, wherein the CSI-RS transmission power of the base station may be an absolute value level and the transmission power of the at least one RRH may correspond to a difference value with the CSI-RS power of the base station. The CSI-RS transmission power information of the base station and the at least one RRH may be received in a type of a physical downlink shared channel (PDSCH)-Config information element message.

To achieve these objects and other advantages and in accordance with the purpose of the invention, a user equipment of determining an uplink transmission power in a macro cell environment that includes at least one remote radio head (RRH) comprises a receiver receiving, from a base station, channel state information-reference signal (CSI-RS) configuration information and CSI-RS transmission power information of the base station and the at least one RRH; and a processor for measuring the signal strength of CSI-RS received from the at least one RRH, and estimating a downlink path loss that corresponds to a node that is set as a reception point or a reception RRH by using the signal strength of the received CSI-RS, the CSI-RS configuration information and the CSI-RS transmission power information. The processor determines an uplink transmission power, to be transmitted to the node set as the reception point or the reception RRH, by using the estimated downlink path loss, and the user equipment may further comprise a transmitter transmitting an uplink signal to the node set as the reception point or the reception RRH by using the determined uplink transmission power. The receiver may receive the CSI-RS transmission power information of the base station and the at least one RRH in a type of a physical downlink shared channel (PD-SCH)-Config information element message.

Advantageous Effects

In accordance with the embodiment of the present invention, an uplink power for a non-uniform system may be configured easily, whereby communication throughput of a user equipment may be improved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
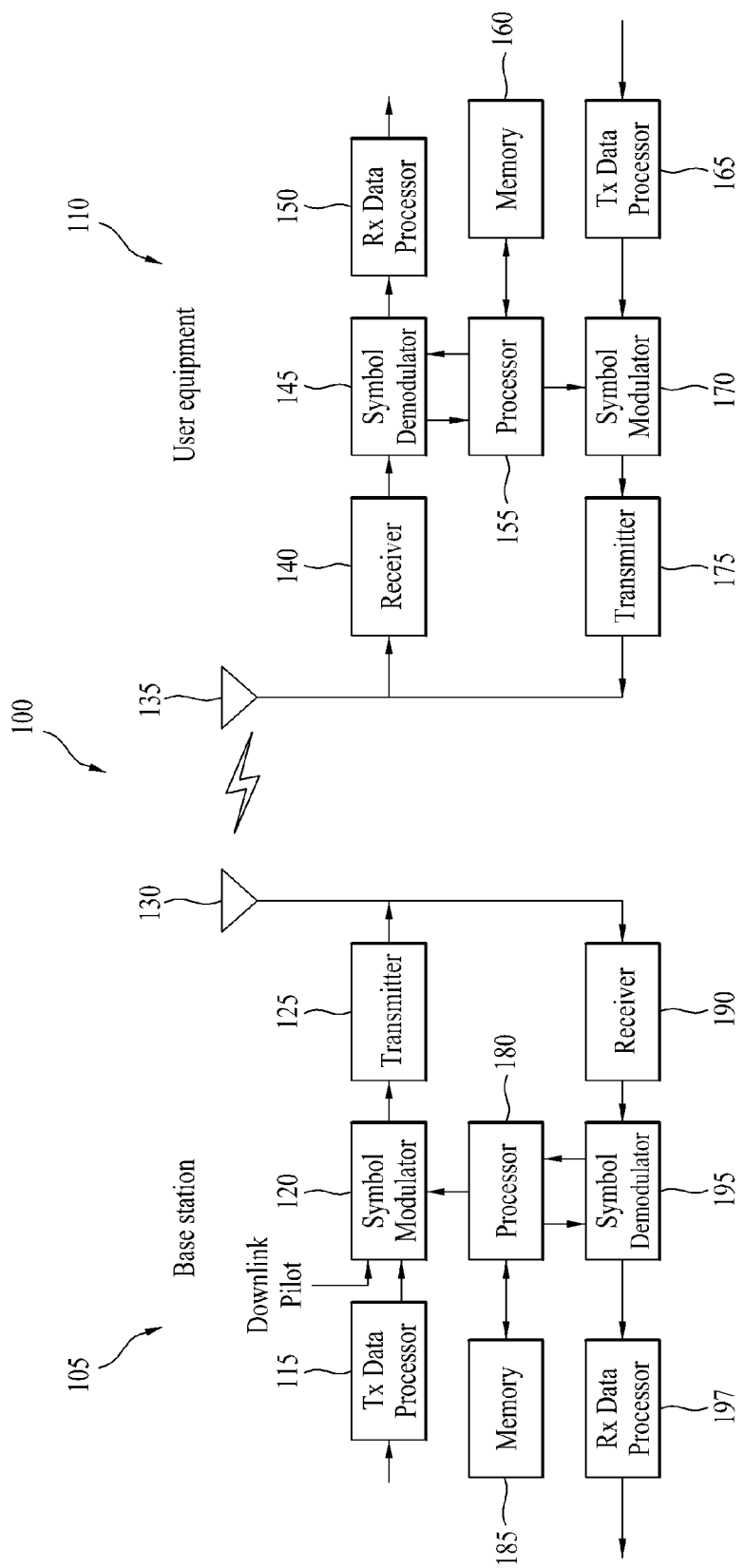
FIG. 1 is a block diagram illustrating configurations of a base station 105 and a user equipment 110 in a wireless communication system 100.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on the assumption that the mobile communication system is the 3GPP LTE or LTE-A system, the following description may be applied to other mobile communication systems except for particular matters of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile station refers to a mobile or fixed type user equipment such as a user equipment (UE), an advanced mobile station (AMS) and a machine to machine (M2M) device. Also, it is assumed that the base station refers to a random node of a network terminal, such as Node B, eNode B, and access point (AP), which performs communication with the user equipment. In this specification, the base station may be used as a concept that includes a cell, sector, etc.

In a wireless communication system, a user equipment may receive information from a base station through a downlink (DL), and may also transmit information to the base station through an uplink. Examples of information transmitted from and received by the user equipment include data and various kinds of control information. Various physical channels exist depending on types and usage of information transmitted from or received by the user equipment.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3$^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Although the following description will be based on the 3GPP LTE/LTE-A to clarify description of the present invention, it is to be understood that the technical spirits of the present invention is not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 1 is a block diagram illustrating configurations of a base station 105 and a user equipment 110 in a wireless communication system.

Although one base station 105, one user equipment 110 are shown for simplification of a wireless communication system 100, the wireless communication system 100 may include one or more base stations and/or one or more user equipments.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 197. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Then, the antenna 130 transmits the generated downlink signals to the user equipment.

In the configuration of the user equipment 110, the antenna 135 receives the downlink signals from the base station 105 and provides the received signals to the receiver 140. The receiver 140 controls (for example, filters, amplifies and frequency downconverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 to store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

Figure 2:
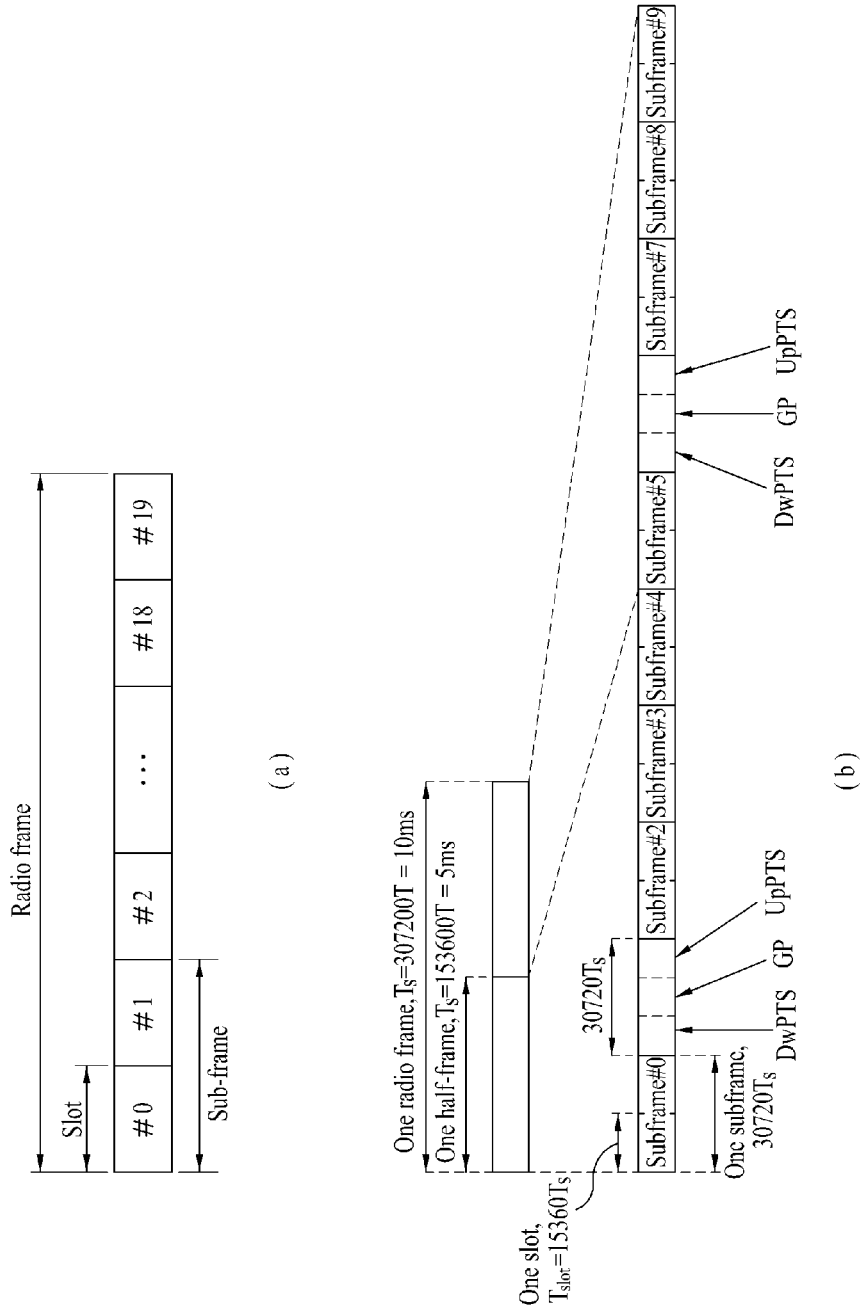
FIG. 2(a) is a diagram illustrating a structure of a radio frame used in a 3GPP LTE system which is an example of a wireless communication system.
FIG. 2(b) is a diagram illustrating a frame structure type 2 used in used in a 3GPP LTE system which is an example of a wireless communication system.

FIG. 2(a) is a diagram illustrating a structure of a radio frame used in a 3GPP LTE system which is an example of a wireless communication system.

Referring to FIG. 2(a), one radio frame has a length of 10 ms (327200×$T_s$) and includes ten(10) subframes of an equal size. Each sub frame has a length of 1 ms and includes two slots. Each slot has a length of 0.5 ms (15360$T_s$). In this case, $T_s$ represents a sampling time, and is expressed by $T_s$=1/(15 kHz×2048)=3.2552×10$^{-8}$(about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

Each half frame includes five subframes, in which the subframe "D" is for downlink transmission, the subframe "U" is for uplink transmission, the subframe "S" is a special subframe that includes a downlink pilot time slot (DwPTS), a guard period (GP), and an uplink pilot time slot (UpPTS). In the special subframe, DwPTS is used for initial cell search, synchronization or channel estimation at the user equipment. UpPTS is used to synchronize uplink transmission of the user equipment and channel estimation at the base station. Also, the guard period is to remove interference occurring in the uplink due to multipath delay of downlink signals between the uplink and the downlink.

In case of 5 ms downlink-uplink switch-point period, the special subframe S exists per half-frame. In case of 5 ms downlink-uplink switch-point period, the special subframe S exists at the first half-frame only. Subframe indexes 0 and 5 (subframe 0 and 5) and DwPTS are for downlink transmission only. The subframe subsequent to the UpPTS and the special subframe is always for uplink transmission. If multi-cells are aggregated, the user equipment may assume the same uplink-downlink configuration for all the cells, and the guard periods of the special frames at different cells are overlapped for at least 1456 Ts. The aforementioned structure of the radio frame is only exemplary, and various modifications may be made in the number of subframes included in the radio frame or the number of slots included in the subframe, or the number of symbols included in the slot.

The following Table 1 illustrates a configuration of the special subframe (length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In the LTE system, one resource block includes twelve(12) subcarriers x seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

FIG. 2(b) is a diagram illustrating a structure of a frame structure type 2 in a 3GPP LTE system which is an example of a wireless communication system.

Referring to FIG. 2(b), the type 2 frame structure is applied to TDD. In the same manner as FIG. 2(a), one radio frame has a length of 10 ms (327200$T_s$) and includes ten(10) subframes of an equal size. Each subframe has a length of 1 ms and includes two slots. Each slot has a length of 0.5 ms (15360$T_s$). In this case, $T_s$ represents a sampling time, and is expressed by $T_s$=1/(15 kHz×2048)=3.2552×10$^{-8}$(about 33 ns).

The following Table 2 illustrates uplink-downlink configuration.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in the 3GPP LTE system, the type 2 frame structure includes seven types of uplink-downlink configurations. The number or location of downlink subframes, special subframes and uplink subframes may be varied per configuration. Hereinafter, various embodiments of the present invention will be described based on the uplink-downlink configuration of the type 2 frame structure illustrated in Table 2.

Figure 3:
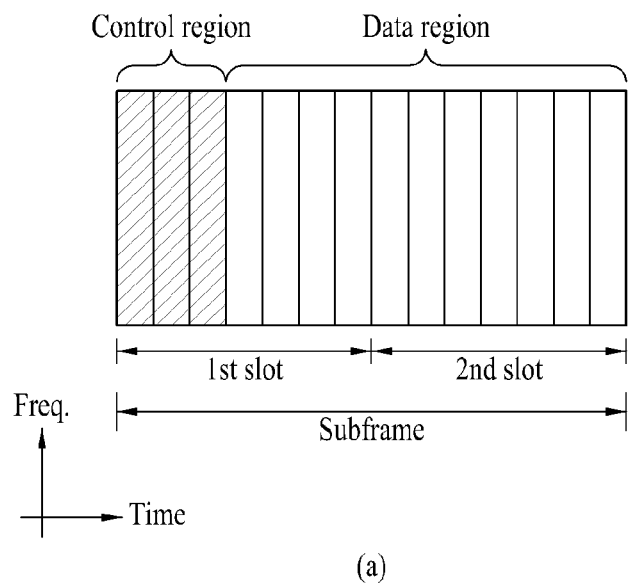
FIGS. 3(a) and 3(b) are diagrams illustrating structures of uplink and downlink subframes of a 3GPP LTE system which is an example of a wireless communication system.
Figure 3:
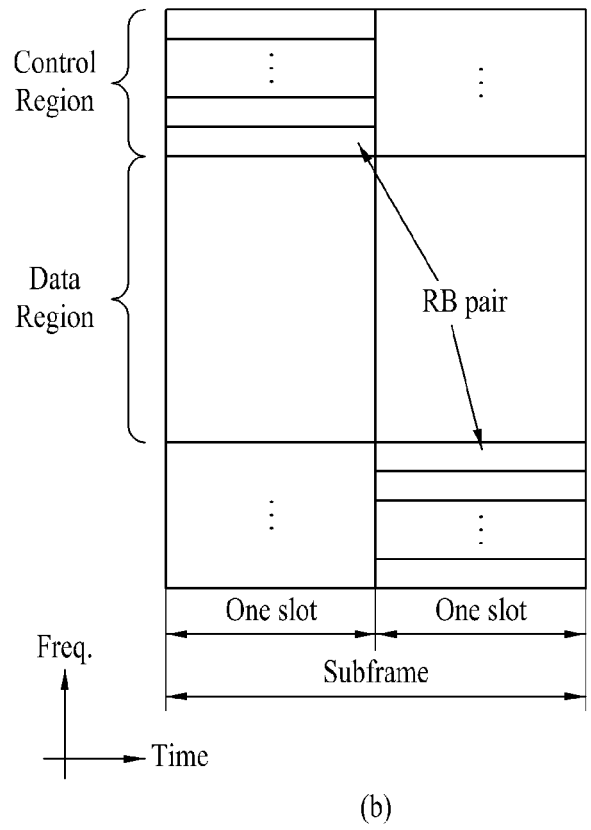

FIGS. 3(a) and 3(b) are diagrams illustrating structures of uplink and downlink subframes of a 3GPP LTE system which is an example of a wireless communication system.

Referring to FIG. 3(a), one downlink subframe includes two slots in a time domain. Maximum three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH transmitted from the first OFDM symbol of the subframe carries information on the number (that is, size of control region) of OFDM symbols used for transmission of the control channels within the subframe. The control information transmitted through the PDCCH will be referred to as downlink control information (DCI). The DCI includes uplink resource allocation information, downlink resource allocation information, and uplink transmission (Tx) power control command for random user equipment groups. The PHICH carries ACK/NACK (acknowledgement/negative-acknowledgement) signals in response to uplink HARQ (Hybrid Automatic Repeat Request). In other words, the ACK/NACK signal for the uplink data transmitted from the user equipment is transmitted on the PHICH.

Now, the PDCCH, which is the downlink physical channel, will be described.

The base station may transmit a resource allocation and transport format (this may be referred to as DL grant) of the PDSCH, resource allocation information (this may be referred to as UL grant) of the PUSCH, aggregation of transmission power control commands for individual user equipments within a random user equipment group, and activity information of voice over Internet protocol (VoIP) through the PDCCH. The base station may transmit a plurality of PDCCHs within the control region, and the user equipment may monitor the plurality of PDCCHs. The PDCCH is configured by aggregation of one or a plurality of continuous control channel elements (CCEs). The base station may transmit the PDCCH, which includes one CCE or aggregation of a plurality of continuous CCEs, through the control region after subblock interleaving. The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCEs.

The control information transmitted from the base station through the PDCCH will be referred to as downlink control information (DCI). The base station may transmit the control information through the PDCCH in accordance with a DCI format illustrated in Table 3 below.

TABLE 3

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to Table 3, the DCI format 0 represents uplink resource allocation information, the DCI formats 1 and 2 represent downlink resource allocation information, and the DCI formats 3 and 3A represent uplink transmit power control (TPC) command for random user equipment groups. The DCI format 3/3A includes TPC commands for a plurality of user equipments. In case of the DCI format 3/3A, the base station masks CRC with TPC-ID. TPC-ID is the identifier demasked by the user equipment to monitor the PDCCH carrying the TPC command. The TPC-ID may be referred to as the identifier used for PDCCH decoding by the user equipment to identify whether the TPC command has been transmitted on the PDCCH. The TPC-ID may be defined by reusing the existing identifier, i.e., C-RNTI (Cell-Radio Network Temporary Identifier), PI-RNTI (Paging Indication-Radio Network Temporary Identifier), SC-RNTI (System Change-Radio Network Temporary Identifier), or RA-RNTI (Random Access Radio Network Temporary Identifier). Alternatively, the TPC-ID may be defined by a new identifier. The TPC-ID is different from C-RNTI which is the identifier for a specific user equipment in that the TPC-ID is the identifier for user equipments of a specific aggregation within a cell, and is also different from PI-RNTI, SC-RNTI, and RA-RNTI, which are the identifiers for all the user equipments within the cell. If the DCI includes TPC commands for N number of user equipments, only N number of user equipments receive the TPC commands. If the TPC commands for all the user equipments within the cell are included in the DCI, the TPC-ID becomes the identifier for all the user equipments within the cell.

The user equipment searches for the TPC-ID by monitoring a set of PDCCH candidates from a search space within the subframe. At this time, the TPC-ID may be searched from a common search space or a user equipment (UE) specific search space. The common search space is the search space searched by all the user equipments within the cell while the user equipment specific search space is the search space searched by a specific user equipment. If a CRC error is not detected through demaksing of TPC-ID from the corresponding PDCCH candidate, the user equipment may receive a TPC command on the PDCCH.

An identifier, TPC-ID for PDCCH carrying a plurality of TPC commands will be defined. If the TPC-ID is detected, the user equipment receives the TPC command on the corresponding PDCCH. The TPC command is used to control a transmission power of an uplink channel. Accordingly, failure of transmission to the base station due to wrong power control or interference to other user equipments may be avoided.

Hereinafter, a method for mapping resources for PDCCH transmission in a base station of the LTE system will be described in brief.

Generally, the base station may transmit scheduling allocation information and other control information through the PDCCH. The physical control channel may be transmitted to one aggregation or a plurality of continuous control channel elements (CCEs). One CCE includes nine resource element groups (REGs). The number of resource element groups (REGs) which are not allocated to a physical control format indicator channel (PCFICH) or a physical hybrid automatic repeat request indicator channel (PHICH) is $N_{REG}$. The CCEs available in the system are from 0 to $N_{CCE}-1$ (in this case, $N_{CCE}=\lfloor N_{REG}/9 \rfloor$). The PDCCH supports multiple formats as expressed in Table 4 below. One PDCCH that includes n number of continuous CCEs starts from CCE that performs i mod n=0 (in this case, i is a CCE number). The multiple PDCCHs may be transmitted to one subframe.

TABLE 4

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 4, the base station may determine a PDCCH format depending on how many regions control information are transmitted to. The user equipment may reduce overhead by reading out the control information in a unit of CCE.

Referring to FIG. 3(b), the uplink subframe may be divided into a control region and a data region on a frequency domain. The control region is allocated to a physical uplink control channel (PUCCH) which carries uplink control information. The data region is allocated to a physical uplink shared channel (PUSCH) which carries user data. In order to maintain single carrier features, one user equipment does not transmit the PUCCH and the PUSCH at the same time. The PUCCH for one user equipment is allocated to resource block (RB) pair at one subframe. Resource blocks (RBs) belonging to the RB pair reserve different subcarriers for two slots. The RB pair allocated to the PUCCH is subjected to frequency hopping at a slot boundary.

Figure 4:
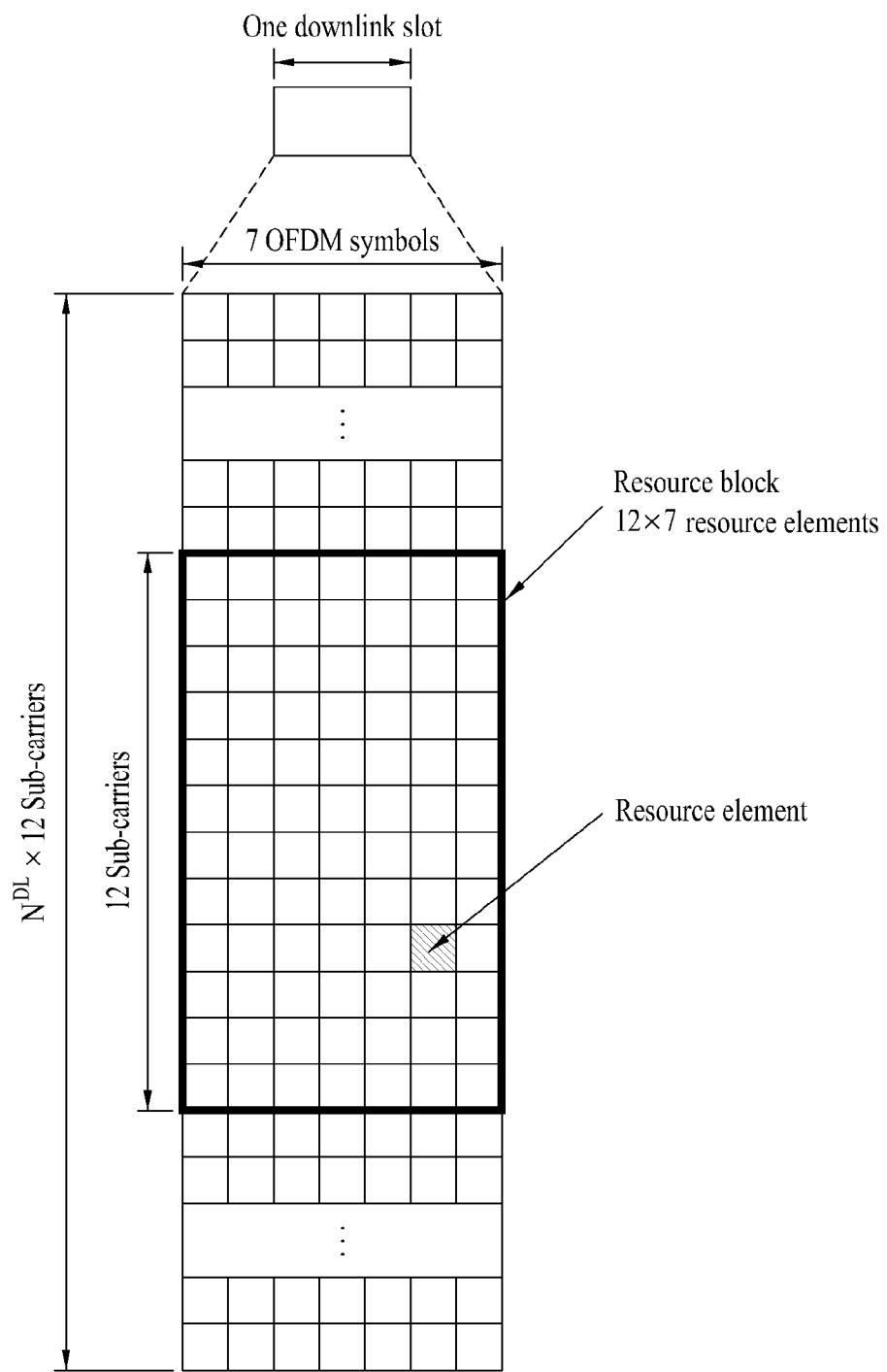
FIG. 4 is a diagram illustrating a time-frequency resource grid structure of a downlink in a 3GPP LTE system.

FIG. 4 is a diagram illustrating a time-frequency resource grid structure of a downlink in a 3GPP LTE system.

A downlink signal transmitted from each slot may be expressed by a resource grid, which includes $N_{RB}^{DL} \times N_{sc}^{RB}$ number of subcarriers and $N_{symb}^{DL}$ number of OFDM (orthogonal frequency division multiplexing) symbols. In this case, $N_{RB}^{DL}$ represents the number of resource blocks (RBs) on the downlink, $N_{sc}^{RB}$ represents the number of subcarriers that constitute one resource block (RB), and $N_{symb}^{DL}$ represents the number of OFDM symbols at one downlink slot. The size of $N_{RB}^{DL}$ may be varied depending on a downlink transmission bandwidth configured within a cell and should satisfy $N_{RB}^{min,DL} \leq N_{RB}^{DL} \leq N_{RB}^{max,DL}$. In this case, $N_{RB}^{min,DL}$ is the smallest downlink bandwidth supported by the wireless communication system, and $N_{RB}^{max,DL}$ is the greatest downlink bandwidth supported by the wireless communication system. Although $N_{RB}^{min,DL}=6$ and $N_{RB}^{max,DL}=110$ may be provided, the present invention is not limited to this example. The number of OFDM symbols included in one slot may be varied depending on a length of cyclic prefix (CP) and interval of the subcarriers. In case of MIMO antenna transmission, one resource grid may be defined per one antenna port.

Each element within the resource grid for each antenna port is referred to as a resource element (RE), and is uniquely identified by a pair of indexes (k,l) within the slot. In this case, k is an index in the frequency domain, l is an index in the time domain. Also, k has any one value of $0, \ldots, N_{RB}^{DL} N_{sc}^{RB}-1$, and l has any one value of $0, \ldots, N_{symb}^{DL}-1$.

The resource block shown in FIG. 4 is used to describe the mapping relation between a physical channel and resource elements. The RB may be divided into a physical resource block (PRB) and a virtual resource block (VRB). The one physical resource block is defined by $N_{symb}^{DL}$ continuous OFDM symbols in the time domain and $N_{sc}^{RB}$ continuous subcarriers in the frequency domain. In this case, $N_{symb}^{DL}$ and $N_{sc}^{RB}$ may be the values previously defined. For example, $N_{symb}^{DL}$ and $N_{sc}^{RB}$ may be given as illustrated in Table 5 below. Accordingly, one PRB includes $N_{symb}^{DL} \times N_{sc}^{RB}$ number of resource elements. One PRB corresponds to, but not limited to, one slot in the time domain, and corresponds to, but not limited to, 180 kHz in the frequency domain.

TABLE 5

| Configuration | | $N_{sc}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has values from 0 to $N_{RB}^{DL}-1$ in the frequency domain. The relation between the physical resource block number $n_{PRB}$ and resource elements (k,l) within one slot satisfies $$n_{PRB} = \left\lfloor \frac{k}{N_{sc}^{RB}} \right\rfloor.$$

The virtual resource block (VRB) has the same size as that of the physical resource block (PRB). The VRB may be divided into a localized virtual resource block (LVRB) and a distributed virtual resource blocks (DVRB). For each VRB, a pair of VRBs in two slots within one subframe are allocated together with a single virtual resource block number $n_{VRB}$.

The VRB may have the same size as that of the PRB. Two types of VRBs are defined, wherein the first type is the localized VRB (LVRB) and the second type is the distributed VRB (DVRB). For each VRB, a pair of VRBs are allocated to two slots of one subframe together with a single VRB index (hereinafter, may be referred to as VRB number). In other words, $N_{RB}^{DL}$ number of VRBs belonging to the first slot of two slots constituting one subframe are allocated with any one index of 0 to $N_{RB}^{DL}-1$, $N_{RB}^{DL}$ number of VRBs belonging to the second slot are allocated with any one index of 0 to $N_{RB}^{DL}-1$.

Hereinafter, a procedure of transmitting a PDCCH from a base station to a user equipment in an LTE system will be described.

The base station determines a PDCCH format depending on the DCI transmitted to the user equipment, and attaches cyclic redundancy check (CRC) to the control information. The CRC is masked with a unique identifier (for example, radio network temporary identifier (RNTI)) depending on owner of the PDCCH or usage of the PDCCH. If the PDCCH is for a specific user equipment, cell-RNTI (C-RNTI) of the corresponding user equipment may be masked with the CRC. If the PDCCH is for a paging message, a paging indicator identifier, for example, Paging-RNTI (P-RNTI) may be masked with the CRC. If the PDCCH is for system information, system information identifier and system information RNTI (SI-RNTI) may be masked with the CRC. In order to indicate a random access response which is the response to transmission of a random access preamble of the user equipment, a random access RNTI (RA-RNTI) may be masked with the CRC. The following Table 6 illustrates an example of identifiers masked with the PDCCH.

TABLE 6

| Type | Identifier | Description |
| --- | --- | --- |
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If the C-RNTI is used, the PDCCH carries control information for the corresponding specific user equipment. If another RNTI is used, the PDCCH carries common control information received by all user equipments or a plurality of user equipments within the cell. The base station generates coded data by performing channel coding for the DCI to which CRC is added. And, the base station performs rate matching based on the number of CCEs allocated to PDCCH format. Afterwards, the base station generates modulation symbols by modulating the coded data, and maps the modulation symbols into physical resource elements.

Carrier Aggregation

3GPP (3rd Generation Partnership Project) designates the next generation wireless communication system of the LTE system as a long term evolution-advanced (LTE-A) system and designs the next generation wireless communication system to enable data transmission of high speed and large capacity. The LTE-A system adopts the carrier aggregation (CA) technology and performs transmission by aggregating a plurality of component carriers (CCs), whereby a transmission bandwidth of the user equipment is improved and usage frequency of the frequency is increased. The LTE-A system may extend the bandwidth to reach 100 MHz by simultaneously using and grouping a plurality of carriers (that is, multiple carriers) not a single carrier used in the existing LTE Rel-8/9. In other words, carriers defined to reach maximum 20 MHz in the existing LTE Rel-8/9 have been re-defined as component carriers, and the carrier aggregation technology have allowed one user equipment to use maximum five component carriers (CCs).

The current carrier aggregation technology has features as follows.

(1) The carrier aggregation technology supports aggregation of contiguous component carriers, and supports aggregation of non-contiguous component carriers.

(2) The number of carrier aggregations on the uplink may be different from that of carrier aggregations on the downlink. If the current system should be compatible with the existing system, the same number of component carriers may be configured on the uplink and the downlink.

(3) Different numbers of component carriers for the uplink and the downlink may be configured to acquire different transmission bandwidths.

(4) Each component carrier (CC) independently transmits one transmission block to the user equipment, and includes an independent hybrid automatic repeat request (HARQ) mechanism.

Unlike the existing LTE system that uses one carrier, a method for effectively controlling component carriers in carrier aggregation that uses a plurality of component carriers has been required. In order to efficiently control the component carriers, the component carriers may be classified in accordance with their functions and features. The component carriers may be divided into a primary component carrier (PCC) and secondary component carrier (SCC). The primary component carrier PCC is the component carrier that becomes a core for control of several component carriers when the component carriers are used, and is defined for each user equipment. The primary component carrier PCC may be referred to as a primary cell (PCell).

The other component carriers except for one primary component carrier PCC are defined as secondary component carriers SCCs. The secondary component carrier SCC may be referred to as a secondary cell (SCell). The primary component carrier may serve as a core carrier that controls all the aggregated component carriers. The other secondary component carriers may serve to provide additional frequency resources for providing a high transmission rate. For example, connection (RRC) for signaling between the base station and the user equipment may be performed through the primary component carrier. Information for security and upper layer may also be provided through the primary component carrier. Actually, if only one component carrier exists, the corresponding component carrier will be the primary component carrier. At this time, the component carrier may perform the same function as that of the carrier of the existing LTE system.

In the carrier aggregation, the downlink resource may be defined as a downlink component carrier (DL CC), and the uplink resource may be defined as an uplink component carrier (UL CC). Also, combination of the downlink resource and the uplink resource may be referred to as a cell. However, if the DL CC and the UL CC are configured asymmetrically with each other, the cell may refer to the DL CC (or UL CC) only. For example, if one serving cell is configured in a specific user equipment, the user equipment has 1 DL CC and 1 UL CC. However, if two or more serving cells are set to the specific user equipment, the user equipment has DL CCs equivalent to the number of cells, and the number of UL CCs may be equal to or smaller than the number of DL CCs. Alternatively, if a plurality of serving cells are set to the specific user equipment, the user equipment may be supported by CA environment where the number of UL CCs is more than the number of DL CCs.

Linkage between a carrier frequency (center frequency of cell) of the downlink resource and a carrier frequency of the uplink resource may be indicated by system information (SI) transmitted on the downlink resource. For example, combination of DL resource and UL resource may be configured by linkage defined by system information block type 2 (SIB2).

In accordance with the above definition, carrier aggregation (CA) may be referred to as aggregation of two or more cells of which carrier frequencies are different from each other. In other words, the case where two or more serving cells of which carrier frequencies are different from each other are set to the specific user equipment may be referred to as the CA environment. The bandwidth increased by aggregation of one or more secondary cells SCells and the primary cell PCell may be supported to the user equipments that support CA.

In this case, the serving cell may be the PCell or SCell. If the user equipment which is RRC connected (RRC_CONNECTED) does not support CA, only one serving cell, which includes the PCell, exists. Alternatively, if the user equipment which is RRC connected (RRC_CONNECTED) supports CA, the serving cell refers to a set of one or more cells, which include PCell and SCells.

The PCell is the cell that is a core of control related communication, among serving cells configured under the CA environment. The PCell may be used such that the user equipment performs an initial connection establishment procedure, connection re-establishment procedure, or handover procedure. The user equipment may receive important control information (for example, PUCCH) through its PCell. Also, the user equipment may perform a monitoring procedure related to change and acquisition of the system information at the PCell only. However, the user equipment may receive control information through the SCell as the case may be. For the user equipment that supports CA, the base station may change the PCell through the handover procedure only, which uses RRCConnectionReconfiguration message including mobilityControlInfo.

Next, the SCells mean the other cells except for the PCell, among the serving cells configured under the CA environment. No PUCCH exists in the SCells. If the SCell is additionally provided, the base station may provide the user equipment, which supports CA, with all kinds of system information related to action at the corresponding cell of the RRC_CONNECTED state through dedicated signaling. For the SCells, the system information may be changed by release and addition of the corresponding SCell through one RRCConnectionReconfiguration message. The base station may transmit dedicated signaling having a parameter different from that included in the broadcast message at the corresponding SCell to the user equipment. After initial security activation procedure, the base station may set one or more SCells, in addition to the PCell (set as the serving cell during connection establishment procedure), to the user equipment. The PCell may be used to provide security input and upper layer system information, while the SCell may be used to provide additional downlink resource and may be used to provide uplink resource if necessary. The base station may independently add, remove or correct the SCell through the RRC connection re-establishment procedure based on RRCConnectionReconfiguration message that includes mobilityControlInfo or not.

In carrier aggregation, the multiple carriers may be divided into the PCell and the SCells, which are user equipment specific (UE-specific) parameters. The specific user equipment may have one or more configured serving cells. If a plurality of configured serving cells exist, one of the cells becomes the PCell and the other cells become the SCells. In this case, the PCell may be configured as the cell having the lowest index of cell indexes (for example, ServCellIndex). Also, when the user equipment has a plurality of configured cells in case of TDD, UL-DL configuration that defines UL subframe through which ACK/NACK for a PDSCH is transmitted for a specific DL subframe may equally be performed for all the cells.

Also, the user equipment may transmit uplink control information, such as channel state information (CSI) (refer to CQI, RI, PMI, etc.) measured from one or more CCs and HARQ ACK/NACK, from one CC, which is previously determined, to the base station. For example, the user equipment may collect a plurality of kinds of ACK/NACK information received from the PCell DL CC and the SCell(s) DL CC (for example, ACK/NACK multiplexing or ACK/NACK bundling) and transmit the collected ACK/NACK information by using one PUCCH through UL CC within the PCell.

Figure 5A:
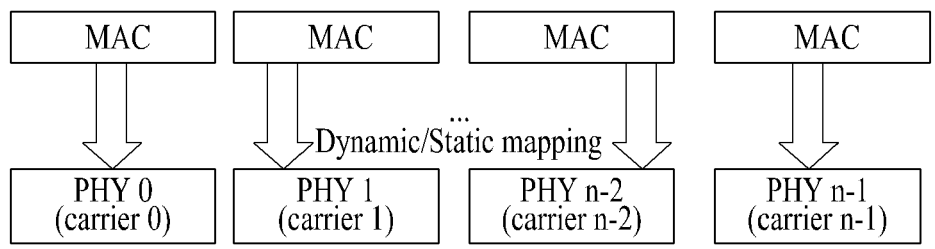
FIG. 5A and FIG. 5B are diagrams illustrating configurations of a physical layer (first layer L1) and a MAC layer (second layer, L2) of a multiple carrier support system.
Figure 5B:
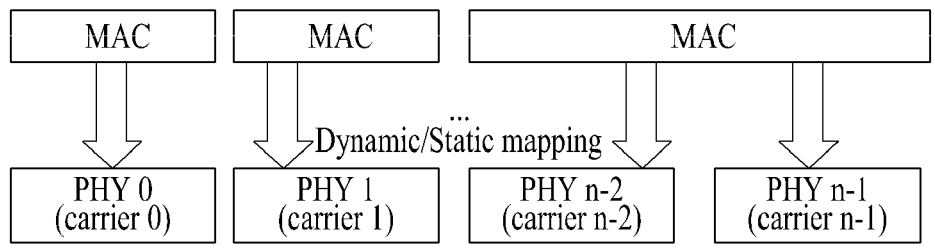

FIG. 5A and FIG. 5B are diagrams illustrating configurations of a physical layer (first layer L1) and a MAC layer (second layer, L2) of a multiple carrier support system.

One physical (PHY) layer that supports one carrier exists in the base station of the existing wireless communication system that supports a single carrier, and one medium access control (MAC) entity that controls one PHY entity may be provided to the base station. In the PHY layer, for example, a baseband processing operation may be performed. In the MAC layer, a MAC protocol data unit (PDU) may be generated through a transmitter, and L1/L2 scheduler operation that covers MAC/RLC sub layer may be performed. A MAC PDU packet block of the MAC layer is converted into a transport block through a logic transport layer and then mapped into a physical layer input information block. The MAC layer of FIG. 5 may be expressed as the entire layer of L2 and may be used to cover MAC/RLC/PDCP sub layers. This may be applied to the description of the MAC layer in the present invention.

In the meantime, a plurality of MAC-PHY entities may be provided in the multiple carrier support system. In other words, a transmitter and a receiver of the multiple carrier support system may be configured in such a manner that one MAC-PHY entity corresponds to each of n number of component carriers as shown in FIG. 5A. Since the separate PHY layer and the separate MAC layer are configured for each component carrier, the PDSCH is generated for each component carrier in the physical layer from the MAC PDU.

Alternatively, one common MAC entity and a plurality of PHY entities may be provided in the multiple carrier support system. In other words, a transmitter and a receiver of the multiple carrier support system may be configured in such a manner that n number of PHY entities corresponding to each of n number of component carriers are provided and one common MAC entity, which controls the n number of PHY entities, exists. In this case, the MAC PDU from one MAC layer may be divided into a plurality of transport blocks corresponding to each of the plurality of component carriers on the transmission layer. Alternatively, the MAC PDU may be divided for each component carrier when the MAC PDU is generated by the MAC layer or when the RLC PDU is generated by the RLC layer. As a result, the PDSCH is generated for each component carrier in the physical layer.

Figure 6:
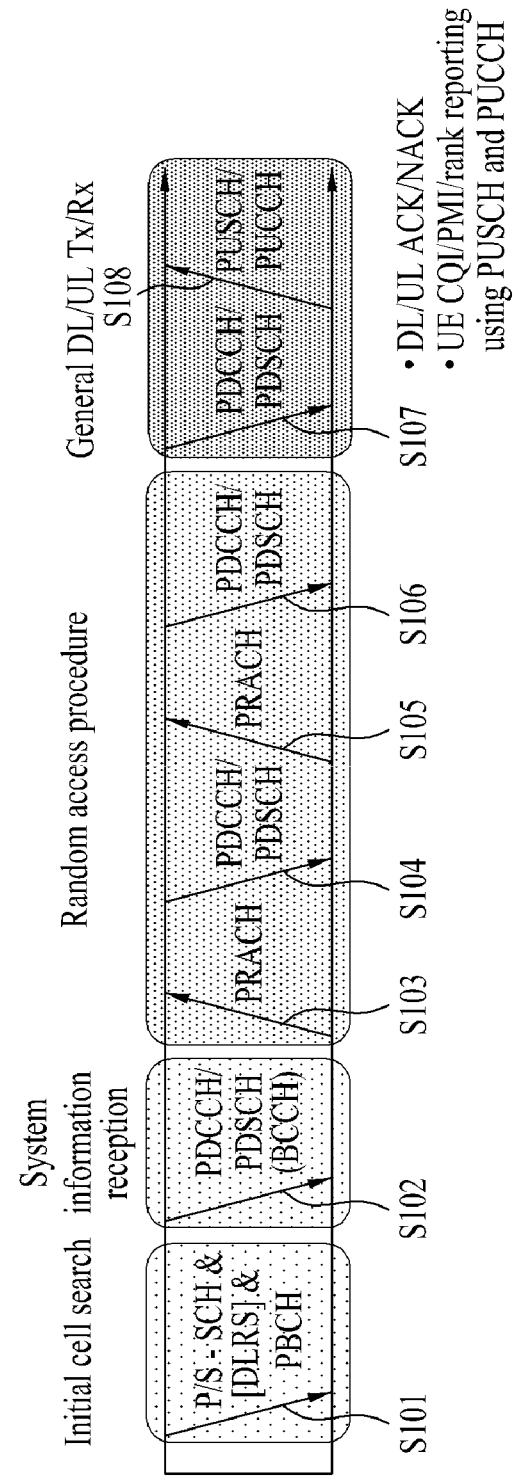
FIG. 6 is a diagram illustrating physical channels used in a 3GPP LTE system which is an example of a wireless communication system and a general method for transmitting a signal using the physical channels.

FIG. 6 is a diagram illustrating physical channels used in a 3GPP LTE system and a general method for transmitting a signal using the physical channels.

The user equipment performs initial cell search such as synchronizing with the base station when it newly enters a cell or the power is turned on at step S101. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S102.

Meanwhile, if the user equipment initially accesses the base station or if there is no radio resource for signal transmission, the user equipment may perform a random access procedure (RACH) such as steps S103 to S106. To this end, the user equipment may transmit a preamble through a physical random access channel (PRACH) (S103), and may receive a response message to the preamble through the PDCCH and the PDSCH corresponding to the PDCCH (S104). In case of a contention based random access except for handover, the user equipment may perform a contention resolution procedure such as transmission (S105) of additional physical random access channel and reception (S106) of the physical downlink control channel and the physical downlink shared channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals. Control information transmitted from the user equipment to the base station through the uplink or received by the user equipment from the base station includes HARQ ACK/NACK (Hybrid Automatic Repeat and reQuest Acknowledgement/Negative-ACK) signal, CQI (Channel Quality Indicator), a PMI (Precoding Matrix Indicator), RI (Rank Indication), etc. In case of the 3GPP LTE system, the user equipment may transmit the control information such as the aforementioned CQI/PMI/RI through the PUSCH and/or the PUCCH.

In the wireless communication system, the reference signal may be divided into two types in accordance with its purpose. Namely, examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received and measured even by a user equipment that does not receive downlink data for a specific subframe. Also, this reference signal for channel measurement may be used for measurement of handover. The latter reference signal is transmitted from the base station together with a corresponding resource when the base station transmits downlink data. In this case, the user equipment may perform channel estimation by receiving the corresponding reference signal, whereby the user equipment may demodulate the data. This reference signal for data demodulation should be transmitted to a region to which data are transmitted.

In the existing 3GPP LTE release-8 system, which is an example of the wireless communication system, two types of downlink reference signals are defined for unicast service. One of the reference signals is a common reference signal (CRS) for acquisition of channel state information and measurement of handover, and the other one is a dedicated RS (DRS) (corresponding to UE-specific reference signal) used for data demodulation. In the LTE Release 8 system, the UE-specific reference signal is used for data demodulation only, and the CRS is used for both acquisition of channel information and data demodulation. The CRS is the cell-specific reference signal, and the base station transmits the CRS per subframe through a wideband. The cell-specific CRS may be transmitted for maximum four antenna ports depending on the number of transmitting antennas of the base station. For example, if the number of transmitting antennas of the base station is two, the CRS for the antenna ports 0 and 1 are transmitted. If the number of transmitting antennas is four, the CRS for the antenna ports 0 to 3 are respectively transmitted. If the number of transmitting antennas of the base station is 4, a CRS pattern at one resource block (RB) is as shown in FIG. 7.

Figure 7:
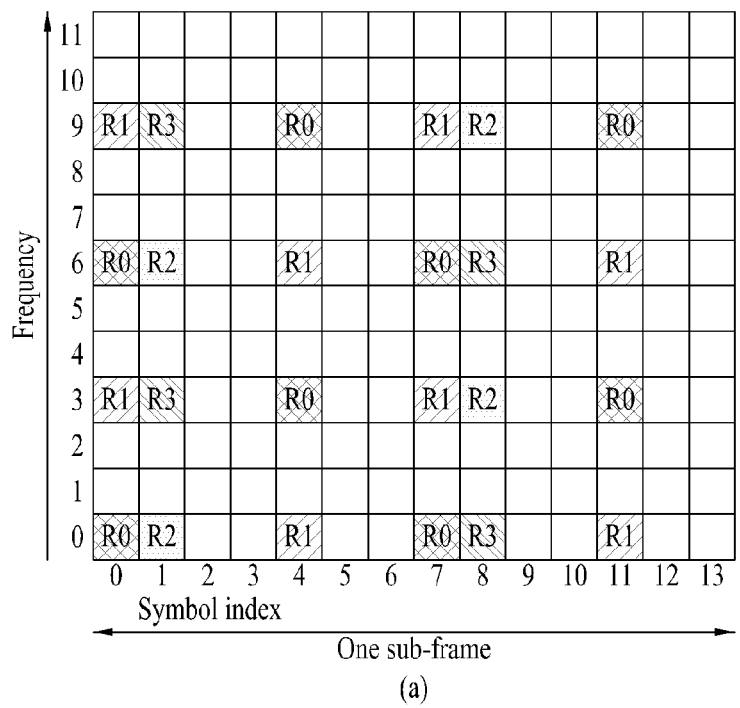
FIG. 7 is a diagram illustrating a CRS pattern in a 3GPP LTE system which is an example of a wireless communication system.
Figure 7:
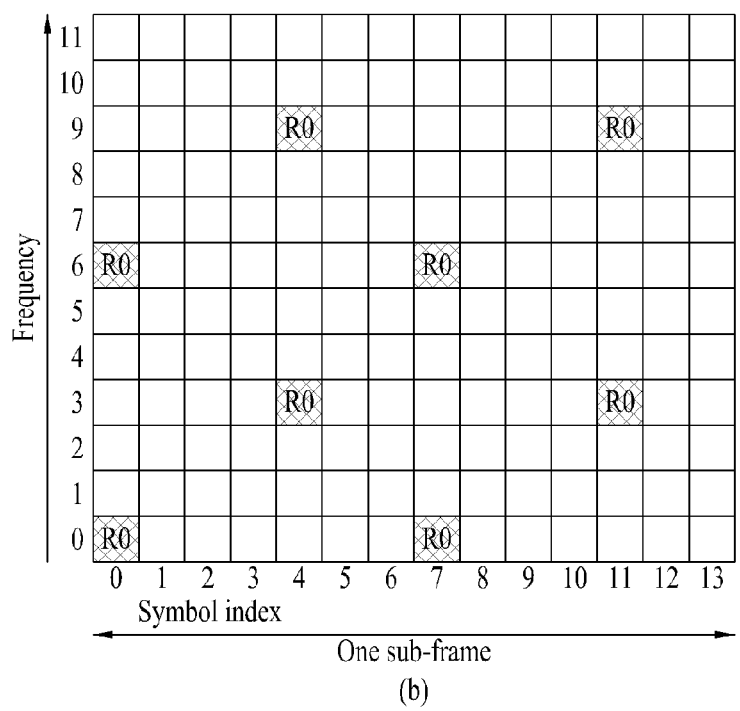

FIG. 7 is a diagram illustrating a CRS pattern in a 3GPP LTE system which is an example of a wireless communication system.

As shown FIG. 7(*a*), CRS R0, R1, R2 and R3 for four antenna ports are allocated so that time-frequency resources are not overlapped with one another at 1RB. In the LTE system, when the CRS is mapped into the time-frequency resources, a reference signal for one antenna port on a frequency axis is mapped into one RE per six resource elements and then transmitted. Since one RB includes twelve REs on the frequency axis, two REs for one antenna port are used per one RB.

FIG. 7(*b*) illustrates a pattern of the reference signal R0 for the antenna port 0 within 1RB.

The LTE-A system which is an evolved version of the LTE system should be designed such that the base station may support maximum eight transmitting antennas to perform downlink transmission. Accordingly, reference signals for the maximum eight transmitting antennas should also be supported. Since downlink reference signals for maximum four antenna ports are defined in the LTE system, if the base station has four to maximum eight downlink transmitting antennas in the LTE-A system, the reference signals for the antenna ports should additionally be defined and designed. The reference signals for the maximum eight transmitting antenna ports should be designed for both the reference signal for channel measurement and the reference signal for data demodulation.

One of the important considerations in designing the LTE-A system is backward compatibility. In other words, the LTE user equipment should be operated without any problem even in the LTE-A system, and the system should also support the operation. In view of transmission of the reference signal, it is required that the reference signals for maximum eight transmitting antenna ports should additionally be defined in the time-frequency domain where the CRS defined in the LTE system is transmitted to a full band per subframe. However, if the reference signal pattern for the maximum eight transmitting antennas is added to the full band per subframe in the LTE-A system in the same manner as the CRS of the existing LTE system, overhead caused by transmission of the reference signal is too increased.

Accordingly, the reference signal newly designed in the LTE-A system may be divided into two types, that is, a channel state information-reference signal (CSI-RS) for channel measurement to select a modulation and coding scheme (MCS), a precoding matrix index (PMI), etc., and a data demodulation-reference signal (DM-RS or DMRS) for data demodulation, which is transmitted through eight transmitting antennas.

The CSI-RS for channel measurement is characterized in that it is designed for channel measurement unlike the existing CRS used for data demodulation simultaneously with channel measurement and measurement of handover. Of course, the CSI-RS may be used for measurement of handover, etc. Since the CSI-RS is transmitted to obtain channel state information, the CSI-RS may not be transmitted per subframe unlike the CRS. Accordingly, in order to reduced overhead caused by the CSI-RS, the base station intermittently transmits the CSI-RS on the time-frequency axis, and transmits a dedicated DM-RS to the scheduled user equipment on the corresponding time-frequency domain to perform data demodulation. In other words, the DM-RS of the specific user equipment is transmitted at the region where the corresponding user equipment is scheduled, that is, the time-frequency domain only where data may be received.

In the LTE-A system, the base station may transmit the CSI-RS for all the antenna ports. However, if the base station transmits the CSI-RS for the maximum eight transmitting antenna ports per subframe, a problem may occur in that overhead is too great. Accordingly, the base station may reduce overhead by intermittently transmitting the CSI-RS on the time axis without transmitting the CSI-RS per subframe. In other words, the base station may transmit the CSI-RS at a period of an integer multiple of one subframe periodically or at a specific transmission pattern. At this time, the base station may configure a transmission period or a transmission pattern of the CSI-RS and notify the user equipment of the configured transmission period or transmission pattern.

The user equipment needs to know information on a time-frequency location of CSI-RS for each antenna port of a cell to which the user equipment belongs, CSI-RS sequence and CSI-RS frequency shift, so as to measure the CSI-RS. Since the CSI-RS is transmitted to know downlink channel information, the CSI-RS should be transmitted to a full band unlike the DRS. The user equipment feeds channel information such as CQI, PMI and rank of each band back to the base station by using the received CSI-RS, and the base station performs a scheduling operation by using the channel information which is fed back. However, if the CSI-RS for the LTE-A user equipment is transmitted to the LTE user equipment, overhead may occur. This is because that the LTE user equipment does not know the presence of the CSI-RS and the base station punctures the corresponding REs if the CSI-RS is transmitted to the LTE user equipment in the scheduled resource region.

Figure 8A:
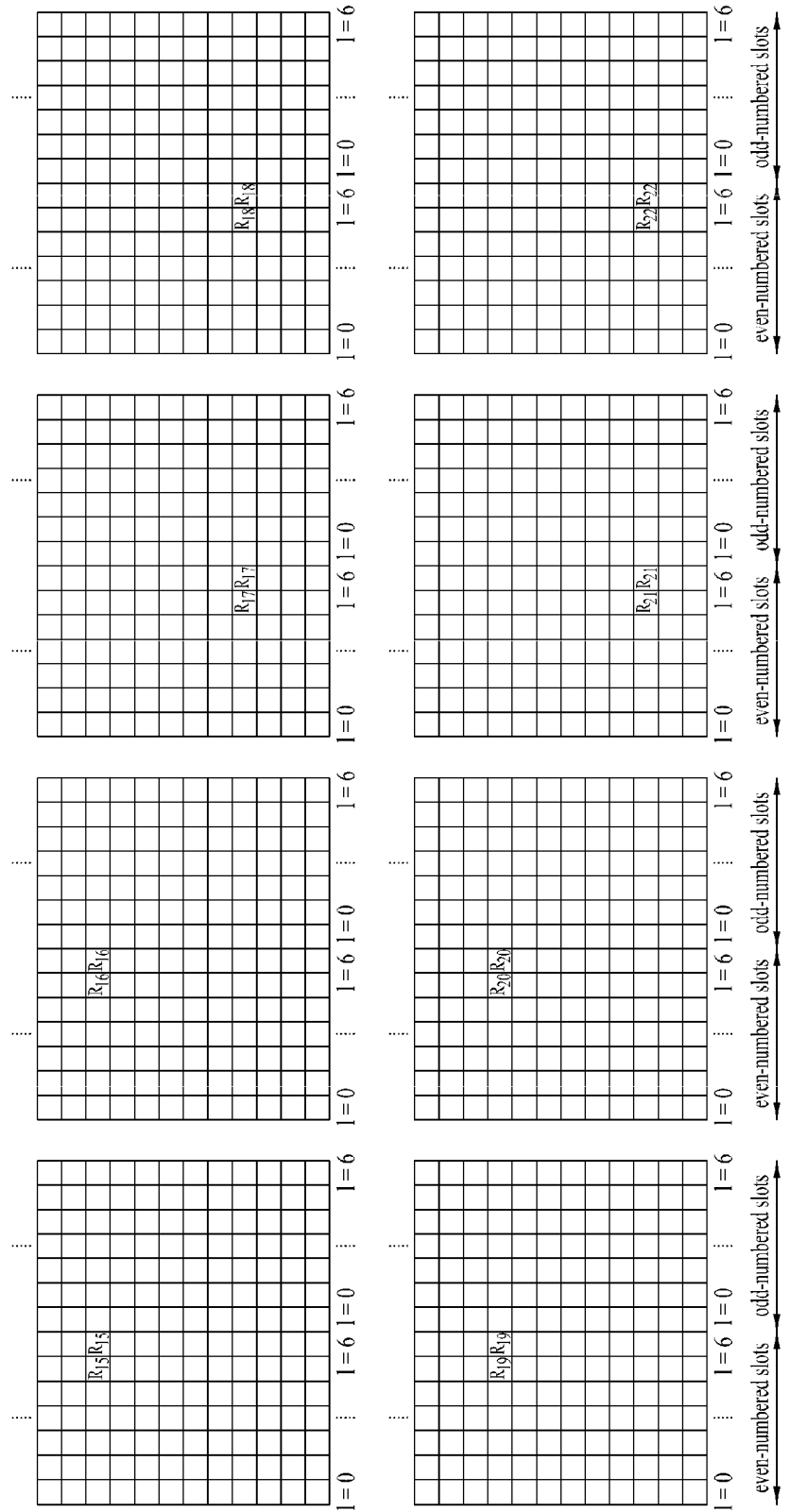
FIG. 8A and FIG. 8B are diagrams illustrating examples of time-frequency location to which CSI-RS is transmitted in a 3GPP LTE, LTE-A system which is an example of a wireless communication system.
Figure 8B:
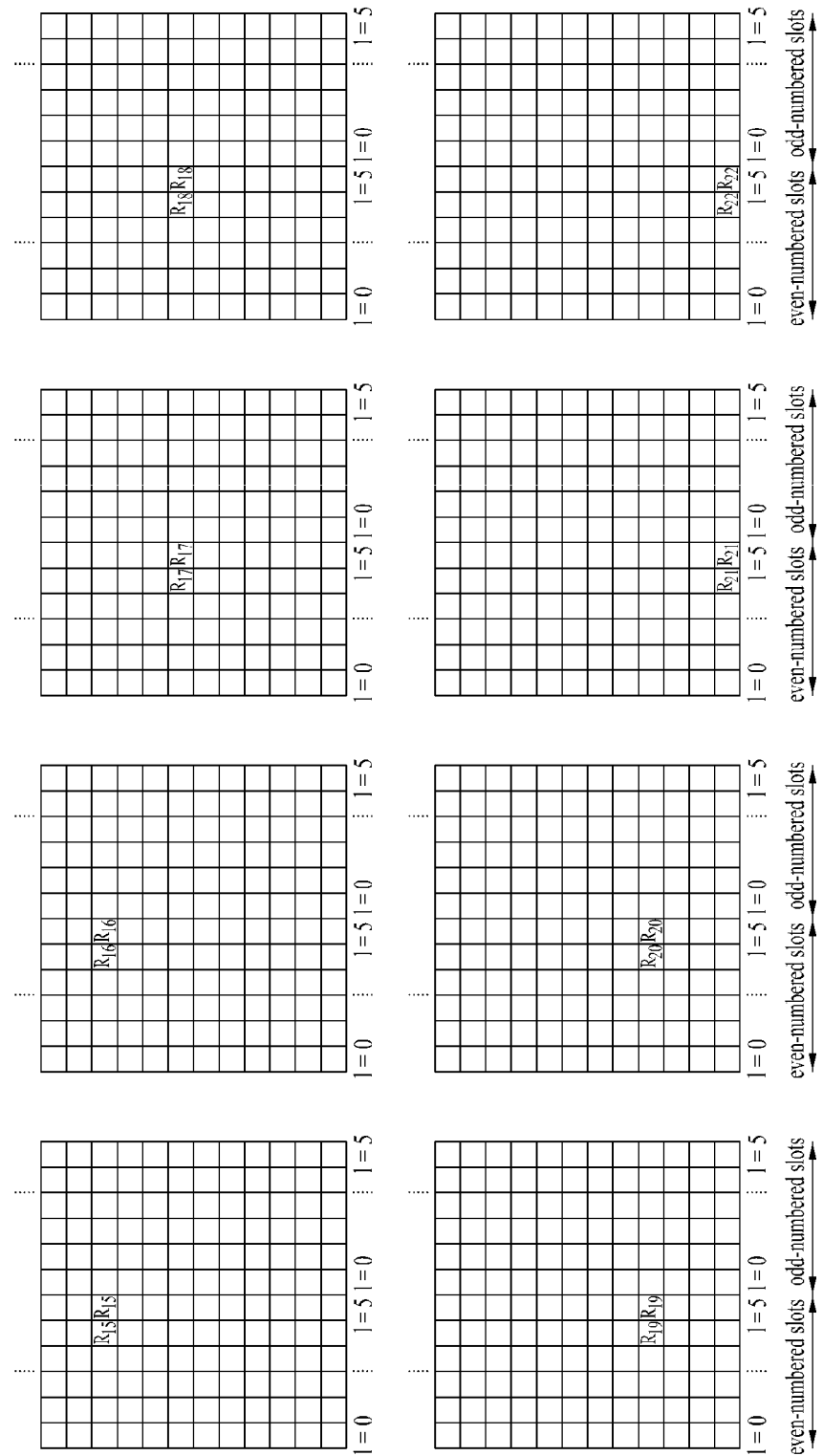

FIG. 8A and FIG. 8B are diagrams illustrating examples of time-frequency location to which CSI-RS is transmitted in a 3GPP LTE, LTE-A system which is an example of a wireless communication system.

In the LTE-A system, the CSI-RS may be transmitted on one, two, four, or eight antenna ports. At this time, each antenna port used for transmission of the CSI-RS is p=15, p=15, 16, p=15, 16, 17, 18, or p=15, . . . , 22.

FIG. 8A illustrates a pattern of the CSI-RS allocated in case of normal prefix of CSI Configuration 0, and FIG. 8B illustrates a pattern of the CSI-RS allocated in case of extended prefix of CSI Configuration 0.

If the base station transmits the CSI-RS as shown in the patterns of FIGS. 8A and 8B, the user equipment may identify the downlink channel state by measuring the CSI-RS and feed channel information (CQI, PMI, RI, etc.) on the downlink channel state back to the base station. Then, the base station performs scheduling for data transmission to a space of a corresponding user equipment through a corresponding modulation and coding scheme (MCS) at a corresponding frequency band, by using the information fed back from the user equipment. Also, the user equipment may calculate path loss from the measured CSI-RS and determine an uplink transmission power by using the calculated path loss.

In the LTE system, the user equipment may estimate downlink (DL) path loss by using the cell-specific reference signal (CRS). To this end, the base station may notify the user equipment of a CRS transmission power, and the user equipment may calculate a path loss component on the basis of the difference between the CRS transmission power notified from the base station and the strength of the received signal, which is actually estimated.

Figure 9:
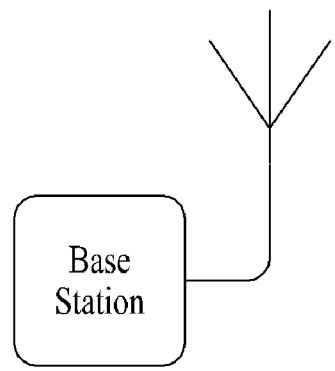
FIG. 9(a) and FIG. 9(b) are diagrams illustrating examples of structures of a base station according to the related art and a base station that includes RRH.
Figure 9:
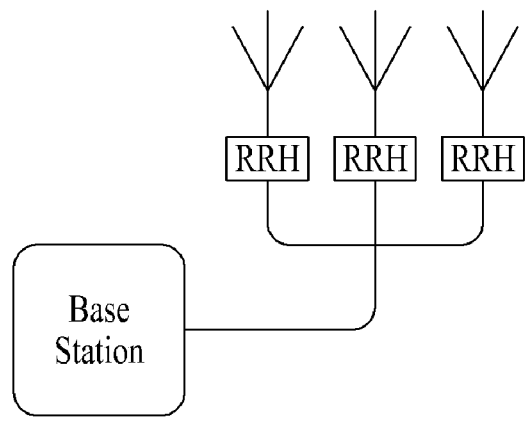

FIG. 9(a) and FIG. 9(b) are diagrams illustrating examples of structures of a base station according to the related art and a base station that includes RRH.

FIG. 9(a) illustrates the structure of the base station according to the related art. As shown in FIG. 9(b), the RRH allows a radio frequency (RF) transceiver and a power amplifier to be detached from the base station and installs them to be close to antennas, whereby the antennas are operated in the same manner as the base station. In this case, the distance between the user equipment and the base station antenna may be reduced, whereby financial resources required for additional facility of the base station may be minimized while the radio capacity is being increased. In this way, the RRH may serve as a relay that is independent from the base station and transmits and receives voice and data by separately detaching a radio part from the base station.

For example, it is assumed that a plurality of nodes (or points) are provided within a macro cell. In this case, the plurality of nodes may be referred to as coordinated RRH set, measurement RRH set, transmission point set, and reception point set, and perform the same function as that of the aforementioned RRH.

In the environment where the RRH is provided, since the user equipment may transmit an uplink signal to another nodes (or RRH) not the base station, downlink path loss components for the nodes should be calculated to determine a transmission power for uplink signal transmission to the nodes not the base station.

However, since the base station and the plurality of nodes may transmit the CRS, it is difficult to identify signals of the base station and the plurality of nodes (for example, RRHs) in view of the user equipment, whereby a problem may occur in estimating exact path loss.

The CRS based path loss estimation described as above allows the user equipment to have a difficulty in identifying whether a downlink path loss component required for determining a transmission power to perform communication with neighboring RRHs relates to corresponding RRHs. This causes difficulty in configuring a proper transmission power for the RRHs, and generates additional interference.

In this respect, as a method for enabling the user equipment to estimate downlink path loss of RRHs within a macro cell, a method for using CSI-RS instead of the related art CRS may be considered.

The CSI-RS may be configured to be identified between the macro cell and each node (RRH) cell commonly or UE specifically. Additionally, simultaneously with CSI-RS configuration, a CSI-RS transmission power level may be configured for each node. In this case, the CSI-RS transmission power level may be one level or multi-level for each node. The base station may notify the user equipment of information on CSI-RS configuration and CSI-RS transmission power information for the nodes. For example, the base station may transmit the CSI-RS configuration and the CSI-RS transmission power to the user equipment through a message indicating the CSI-RS configuration and the CSI-RS transmission power as system information.

Based on the system information, the user equipment may determine a transmission power by using path loss of a target node (or target RRH) to transmit an initial random access signal to the base station.

In the meantime, if the method for identifying RRHs based on the CRS is used, the base station should notify the user equipment of a CRS power transmitted from each RRH. For example, the base station may notify the user equipment of the CRS power by including the CRS in a PDSCH-Config information element. The following Table 7 illustrates an example of information included in the PDSCH-Config information element.

TABLE 7

PDSCH-Cofig information element

```
-- ASNISTART
PDSCH-ConfigCommon ::=    SEQUENCE {
    referenceSignalPower       INTEGER (-60..50),
    p-b                        INTEGER (0..3)
}
PDSCH-ConfigDedicatead::=  SEQUENCE {
    p-a                        ENUMERATED {
                               dB-6, dB-4dot77, dB-3, dB-1dot77,
                               dB0, dB1, dB2, dB3}
                PDSCH-Config field descriptions
``` p-a
Parameter: $P_A$, see TS 36.213 [23, 5.2]. Value dB-6 corresponds to −6 dB, oB-4dot77 corresponds to −4.77 dB etc.
p-b
Parameter: $P_B$, see TS 36.213 [23, Table 5.2-1].
referenceSignalPower
Parameter: Reference-signal power, which provides the downlink reference-signal EPRE, see TS 36.213 [23, 5.2]. The actual value in dBm.

In case of the CSI-RS, the base station may notify the user equipment of a CSI-RS power level through the PDSCH-Config information element message. Alternatively, a power rate may previously be determined in accordance with each CSI-RS configuration as compared with the CRS power.

It may be considered that energy per resource elements (EPRE) of all the CSI-RS are configured equally in a unit of system bandwidth and subframe regardless of the CSI-RS pattern like CRS EPRE power configuration (CRS EPREs are equally configured in a unit of system bandwidth and subframe). In this case, the base station or the RRHs have only to notify the user equipment of a cell common CSI-RS transmission power level. The CSI-RS pattern of the macro cell base station may be different from the CSI-RS pattern of the RRH (the CSI-RS patterns may be identified from each other in the time, frequency or code domain), or not. Also, the CSI-RS transmission power of the macro cell base station may be different from the CSI-RS transmission power of the RRH, or not.

If the CSI-RS transmission power of the macro cell base station is different from the CSI-RS transmission power of the RRH, a method for signaling the CSI-RS transmission power, which is transmitted from the RRHs, from the base station to the user equipments or a method for signaling a difference value in a transmission power between the CSI-RS of the macro cell base station and the CSI-RS of the RRH may be considered. However, if the CSI-RS transmission power of the macro cell base station is the same as the CSI-RS transmission power of the RRH, one common CSI-RS transmission power is notified to the user equipment regardless of the CSI-RS pattern.

The user equipment may estimate downlink path loss for the nodes (for example, coordinated RRH sets) and configure an uplink transmission power in accordance with reception point configuration (that is, RRH configured by reception point) during uplink transmission. In this case, the reception point configuration may be single point configuration or multi-point configuration. Also, a dynamic point selection scheme may be used, whereby the point may be changed depending on time. For example, in case of single point configuration, the point may be changed as the case may be. For another example, the single point may be changed to the multi-point, the multi-point may be changed to the single point, and the multi-point may be changed to the multi-point (in this case, point configuration element is changed). At this time, the user equipment needs to select proper downlink path loss when determining an uplink transmission power. Additionally, it is required to identify each point from path loss of each point. In this case, an index which is previously determined may be used, or the base station may notify the user equipment of identification of each point from path loss of each point through a downlink control information format (DCI format) or higher layer message.

If the dynamic point selection is performed, the base station may notify the user equipment of downlink path loss information on the corresponding point or a difference value with a base station path loss value. The downlink path loss information may be added to the existing DCI format, or a new format may be defined. In other words, the downlink path loss information required for uplink transmission may be notified from the base station to the user equipment.

Hereinafter, power headroom reporting (PHR) will be described. The following Equations 1 to 3 may be used as PHR for PUCCH, which is reported by the user equipment. The Equation 1 is a PHR type corresponding to the case where the PUCCH is transmitted to the base station, and the Equations 2 and 3 are PHR types corresponding to the case where the PUCCH is transmitted to the RRH(s).

$P_{MAX}$(component carrier($CC$(or serving cell($SCell$))) max. power or maximum transmission power of user equipment)$-P_{PUCCH,Macro}$ [dB/linear]  [Equation 1]

$P_{MAX} - P_{PUCCH, multi\text{-}point\ reception}$ [dB/linear]  [Equation 2]

$P_{MAX} - P_{PUCCH\ single\ point\ reception}$ [dB/linear]  [Equation 3]

Next, the following Equations 4 to 6 may be used as PHR for PUSCH, which is reported by the user equipment. The Equation 4 is a PHR type corresponding to the case where the PUSCH is transmitted to the base station, and the Equations 5 and 6 are PHR types corresponding to the case where the PUSCH is transmitted to the RRH(s).

$P_{MAX}$(component carrier($CC$(or serving cell($SCell$))) max. power or maximum transmission power of user equipment)$-P_{PUSCH,Macro}$ [dB/linear]  [Equation 4]

$P_{MAX} - P_{PUSCH, multi\text{-}point\ reception}$ [dB/linear]  [Equation 5]

$P_{MAX} - P_{PUSCH\ single\ point\ reception}$ [dB/linear]  [Equation 6]

The following Equations 7 to 9 represent PHR report type for SRS transmission (PHR for SRS) of the user equipment. The Equation 7 is a PHR type corresponding to the case where the SRS is transmitted to the base station, and the Equations 8 and 9 are PHR types corresponding to the case where the SRS is transmitted to the RRH(s).

$P_{MAX}$(component carrier($CC$(or serving cell($SCell$))) max. power or maximum transmission power of user equipment)$-P_{SRS,Macro}$ [dB/linear]  [Equation 7]

$P_{MAX} - P_{SRS, multi\text{-}point\ reception}$ [dB/linear]  [Equation 8]

$P_{MAX} - P_{SRS\ single\ point\ reception}$ [dB/linear]  [Equation 9]

Next, the following Equations 10 to 12 may be used as PHR for PRACH, which is reported by the user equipment. The Equation 10 is a PHR type corresponding to the case where the PRACH is transmitted to the base station, and the Equations 11 and 12 are PHR types corresponding to the case where the PRACH is transmitted to the RRH(s).

$P_{MAX}$(component carrier($CC$(or serving cell($SCell$)))
max. power or maximum transmission power of
user equipment)$-P_{PRACH,Macro}$ [dB/linear]      [Equation 10]

$P_{MAX}-P_{PRACH,multi-point\ reception}$ [dB/linear]      [Equation 11]

$P_{MAX}-P_{PRACH\ single\ point\ reception}$ [dB/linear]      [Equation 12]

The user equipment may configure combination of PHR for PUCCH, PHR for PUSCH, PHR for SRS, and PHR for PRACH during PHR triggering and transmit the configured information to the base station. Also, the user equipment may configure information by combining three types from PHR for PUCCH, PHR for PUSCH, PHR for SRS, and PHR for PRACH and then report the configured information to the base station. For example, the user equipment may configure information by combining the Equations 1, 2 and 3 from PHR for PUCCH and then report the configured information to the base station. Meanwhile, the base station may indicate a corresponding set to the user equipment in accordance with an uplink transmission condition of the user equipment.

As described above, various kinds of transmission power modes of the user equipment may exist. Examples of the transmission power modes of the user equipment may include power control parameters for the macro cell, power control parameters at the state of multi-point reception and power control parameters for single point reception.

The control parameters for determining an uplink transmission power will be described in brief. PO_PUSCH (j) is a parameter configured by sum of a cell-specific nominal component $P_{O\_NOMINAL\_PUSCH}$(j) provided from the higher layer and a user equipment-specific component $P_{O\_UE\_PUSCH}$(j) provided from the higher layer, and is a value notified from the base station to the user equipment. α(j) is a cell-specific parameter provided from the higher layer and transmitted from the base station at 3 bits, wherein α∈{0, 0.4, 0.5, 0.6, 0.7, 0.8, 0.9, 1} when j=0 or 1, and α(j)=1 when j=2. α(j) is a value notified from the base station to the user equipment. pathloss (PL) is a downlink path loss (or signal loss) estimated value calculated by the user equipment in a unit of dB, and is expressed as PLc=referenceSignalPower-higher layer filteredRSRP, wherein referenceSignalPower may be notified from the base station to the user equipment through the higher layer.

Configuration values such as a path loss component, a value α, Po for PUSCH or PUCCH, $P_{SRS\_OFFSET}$, and TPC command value may be varied. Also, the parameter corresponding to the TPC command value may be used at an absolute mode or an accumulation mode during transmission to the macro cell only, and may be limited to be operated at an absolute mode only in other cases. Also, if three transmission power modes are used, the transmission power modes may be limited to be operated at the absolute mode only. The parameter corresponding to the TPC command may be limited to the absolute mode and may include one power control parameter.

Also, the base station may notify the user equipment of RRC information corresponding to uplink power control of the following Table 8 in accordance with macro, multi-point reception and single point reception. Additionally, information of the following Table 8 for each RRH may be configured respectively and then notified to the user equipment. The mapping relation between the RRH and the following information may be considered as follows. For example, information of the following Table 8 may be configured to exist as much as RRHs (or reception point set) configured within the cell and to be indexed. Then, the base station notifies the user equipment of indexing information on a corresponding point before uplink transmission. In other words, the base station allows the user equipment to use information on a power control parameter required during uplink transmission. Alternatively, a method for notifying the user equipment of a difference value as compared with macro in accordance with each transmission condition may be considered. The base station may notify the user equipment of the difference value by dynamically using DCI format or through RRC message. Also, the base station may notify the user equipment of the difference value through combination of the RRC message and the DCI format.

Also, the base station may notify the user equipment of information on a neighboring cell by considering a non-uniform system condition. In this case, the information on the neighboring cell may be cell ID, power control information and information required for uplink transmission.

TABLE 8

```
UplinkPowerControlCommon ::=      SEQUENCE {
   p0-NominalPUSCH       INTEGER (-126..24),
   alpha                 ENUMERATED {al0, al04, al05, al06, al07,
al08, al09, al1},
   p0-NominalPUCCH                INTEGER (-127..-96),
   deltaFList-PUCCH               DeltaFList-PUCCH,
   deltaPreambleMsg3              INTEGER (-1..6)
}
UplinkPowerControlCommon-v10x0 ::= SEQUENCE {
   deltaF-PUCCH-Format3-r10       ENUMERATED {deltaF-1, deltaF0,
deltaF1, deltaF2,
                                  deltaF3, deltaF4, deltaF5,
deltaF6},
   deltaF-PUCCH-Format1bCS-r10    ENUMERATED {deltaF1,
deltaF2, spare2, spare1}
}
UplinkPowerControlCommonSCell-r10 ::=SEQUENCE {
   p0-NominalPUSCH-r10   INTEGER (-126..24),
   alpha-r10             ENUMERATED {al0, al04, al05, al06, al07,
al08, al09, al1}
}
UplinkPowerControlDedicated ::=    SEQUENCE {
   p0-UE-PUSCH                    INTEGER (-8..7),
   deltaMCS-Enabled               ENUMERATED {en0, en1},
   accumulationEnabled            BOOLEAN,
   p0-UE-PUCCH                    INTEGER (-8..7),
   pSRS-Offset                    INTEGER (0..15),
   filterCoefficient              FilterCoefficient
   DEFAULT fc4
}
UplinkPowerControlDedicated-v10x0 ::= SEQUENCE {
   deltaTxD-OffsetListPUCCH-r10   DeltaTxD-OffsetListPUCCH-r10
   pSRS-OffsetAp-r10              INTEGER (0..15)
   OPTIONAL     -- Need OR
}
UplinkPowerControlDedicatedSCell-r10 ::=     SEQUENCE {
   p0-UE-PUSCH-r10                INTEGER (-8..7),
   deltaMCS-Enabled-r10           ENUMERATED {en0, en1},
   accumulationEnabled-r10        BOOLEAN,
   pSRS-Offset-r10                INTEGER (0..15),
   pSRS-OffsetAp-r10              INTEGER (0..15),
   filterCoefficient-r10          FilterCoefficient
   DEFAULT fc4,
   pathlossReference-r10          ENUMERATED {pCell, sCell}
```

If the user equipment is operated under the control of various kinds power control modes, if the TPC command is operated in an accumulated value mode/type, if there is any change in a value of Po for each channel, and if a new value for $P_{0\_UE\_PUSCH}$, $P_{0\_UE\_PUCCH}$, and $P_{0\_UE\_SRS}$ is received in common for the macro and RRH or received for each RRH, an accumulated TPC command value of the corresponding power control mode is reset.

The base station and the RRH may request the user equipment of PHR triggering by using the DCI format. The user equipment may transmit PHR to the base station whenever point selection or transmission point, reception point, measurement RRH set, and coordinated RRH set are changed.

When MAC CE is configured, CSI-RS pattern index is mapped into PHR information. A prohibitPHR-Timer, a periodicPHR-Timer, and dl_PathlossChange dB are configured for each RRH in an uplink CoMP scenario. This is different from macro, and a triggering condition is configured by combination of macro and RRH. For example, two conditions may be performed to configure PHR information for a corresponding macro and PHR information for RRH, or one of the two conditions may be performed by the user equipment through signaling of the base station. At this time, the information on all the RRHs or information on some RRH depends on the configuration of the base station.

The base station that has received a random access message from the user equipment notifies the user equipment of a random access response message. The random access response message includes a CSI request bit equivalent to 1 bit. The user equipment that has received the random access response message should transmit downlink CSI information to the base station. In order to support the aforementioned system based on the related art as above, the random access response message is required to be changed. For example, the random access response message may include at least one of CSI information of the macro cell, CSI information of the best node, CSI information of one reception node set which is previously configured, and CSI information on a plurality of reception node sets which are previously configured. The base station may combine these four kinds of CSI information and then notify the user equipment of the combined information.

CSI-RS/CRS power of each node or the base station may be notified to the user equipment in such a manner that an absolute value dB/dBm/linear(mW, W) is notified or an index of a table which is previously determined is notified, or only a difference value as compared with a reference node is notified.

In accordance with the embodiment of the present invention, uplink power configuration for the non-uniform system may be facilitated, whereby communication throughput of the user equipment may be improved.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The method for enabling a user equipment to determine an uplink transmission power in a macro cell environment that includes at least one RRH may be used industrially in various communication systems such as 3GPP LTE, LTE-A and IEEE 802.

The invention claimed is:

1. A method of determining an uplink transmission power by a user equipment in a macro cell environment that includes at least one remote radio head (RRH), the method comprising the steps of:

receiving, from a base station, channel state information-reference signal (CSI-RS) configuration information and CSI-RS transmission power information of the base station and the at least one RRH, wherein the CSI-RS transmission power information includes a CSI-RS transmission power level of the base station and the at least one RRH, the CSI-RS transmission power of the base station is an absolute value level and the transmission power of the at least one RRH corresponds to a difference value with the CSI-RS power of the base station;

measuring a signal strength of CSI-RS received from the at least one RRH; and estimating a downlink path loss that corresponds to a node that is set as a reception point or a reception RRH by using the signal strength of the received CSI-RS, the CSI-RS configuration information and the CSI-RS transmission power information, determining an uplink transmission power, to be transmitted to the node set as the reception point or the reception RRH, based on the estimated downlink path loss; and transmitting an uplink signal to the node set as the reception point or the reception RRH by using the determined uplink transmission power.

2. The method according to claim 1, wherein the CSI-RS configuration information further includes CSI-RS allocation pattern information of the base station and the at least one RRH, and CSI-RS allocation patterns between the base station and the at least one RRH are identified from each other in a time domain, a frequency domain or a code domain.

3. The method according to claim 1, wherein the CSI-RS transmission power information of the base station and the at least one RRH is received in a physical downlink shared channel (PDSCH)-Config information element message.

4. A user equipment of determining an uplink transmission power in a macro cell environment that includes at least one remote radio head (RRH), the user equipment comprising:

a receiver configured to receive, from a base station, channel state information-reference signal (CSI-RS) configuration information and CSI-RS transmission power information of the base station and the at least one RRH, wherein the CSI-RS transmission power information includes a CSI-RS transmission power level of the base station and the at least one RRH, the CSI-RS transmission power of the base station is an absolute value level and the transmission power of the at least one RRH corresponds to a difference value with the CSI-RS power of the base station;

a processor configured to measure a signal strength of CSI-RS received from the at least one RRH, estimate a downlink path loss that corresponds to a node that is set as a reception point or a reception RRH by using the signal strength of the received CSI-RS, the CSI-RS configuration information and the CSI-RS transmission power information, and determine an uplink transmission power, to be transmitted to the node set as the reception point or the reception RRH, based on the estimated downlink path loss; and a transmitter configured to transmit an uplink signal to the node set as the reception point or the reception RRH by using the determined uplink transmission power.

5. The user equipment according to claim 4, wherein the CSI-RS configuration information further includes CSI-RS allocation pattern information of the base station and the at least one RRH, and CSI-RS allocation patterns between the base station and the at least one RRH are identified from each other in a time domain, a frequency domain or a code domain.

6. The user equipment according to claim 4, wherein the receiver receives the CSI-RS transmission power information of the base station and the at least one RRH in a physical downlink shared channel (PDSCH)-Config information element message.

\* \* \* \* \*